United States Patent
Lee et al.

(10) Patent No.: US 8,766,114 B2
(45) Date of Patent: Jul. 1, 2014

(54) KEYPAD APPARATUS FOR PORTABLE COMMUNICATION DEVICE

(75) Inventors: Soo-Hyun Lee, Seoul (KR); Seok-Gyu Lee, Gyeonggi-do (KR); Cheol-Hee Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 159 days.

(21) Appl. No.: 13/222,040

(22) Filed: Aug. 31, 2011

(65) Prior Publication Data

US 2012/0085632 A1  Apr. 12, 2012

(30) Foreign Application Priority Data

Oct. 7, 2010  (KR) .................. 10-2010-0097751

(51) Int. Cl.
*H01H 9/26* (2006.01)
*H01H 13/72* (2006.01)
*H01H 13/76* (2006.01)

(52) U.S. Cl.
USPC ........................................... 200/5 A

(58) Field of Classification Search
USPC .......... 200/310, 5 A, 5 R, 511–512, 520, 521, 200/308, 311, 313, 314, 317, 337, 341, 343, 200/345, 292, 329
See application file for complete search history.

(56) References Cited

U.S. PATENT DOCUMENTS

| | | | |
|---|---|---|---|
| 7,411,142 B2* | 8/2008 | Jung et al. | 200/314 |
| 7,947,915 B2* | 5/2011 | Lee et al. | 200/314 |
| 8,022,324 B2* | 9/2011 | Liu | 200/314 |
| 8,338,730 B2* | 12/2012 | Kim et al. | 200/314 |
| 2008/0151526 A1* | 6/2008 | Miyashita et al. | 362/29 |
| 2008/0170381 A1 | 7/2008 | Chou et al. | |
| 2009/0194401 A1* | 8/2009 | Kim | 200/314 |
| 2010/0108481 A1 | 5/2010 | Chiang | |
| 2010/0108486 A1* | 5/2010 | Yoshida | 200/520 |
| 2010/0147661 A1* | 6/2010 | Takeda | 200/314 |

FOREIGN PATENT DOCUMENTS

DE  10-2007-025433 A1  12/2007
WO  2008-010678 A1  1/2008

* cited by examiner

*Primary Examiner* — Edwin A. Leon
*Assistant Examiner* — Anthony R. Jimenez
(74) *Attorney, Agent, or Firm* — Cha & Reiter, LLC

(57) ABSTRACT

Provided is a keypad apparatus for a portable communication device structured to have a Printed Circuit Board (PCB) including a plurality of dome switches and a plurality of Light-Emitting Diodes (LEDs). The keypad apparatus includes a waveguide sheet portion provided on the dome switches, a plurality of printed surfaces which are printed on a top surface of the waveguide sheet portion and adjust a brightness of light from the LEDs, in a stepwise manner from a position distant from the LEDs to a position adjacent to the LEDs, and a keypad provided on the printed surfaces.

18 Claims, 4 Drawing Sheets

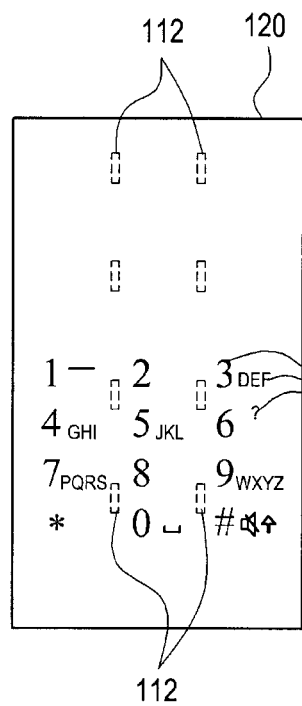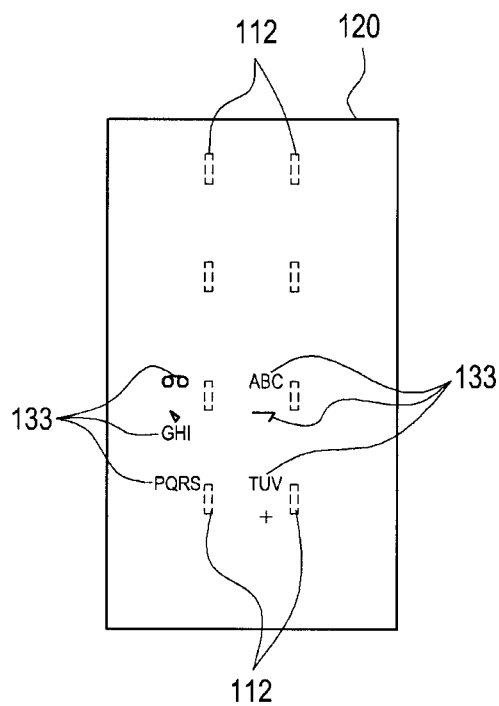
FIG.7  FIG.8
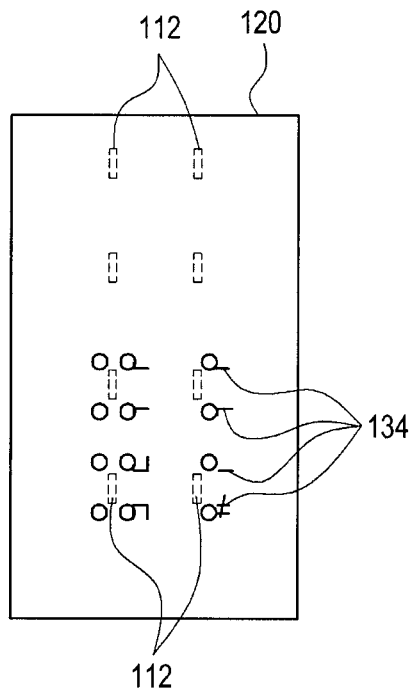
FIG.9

KEYPAD APPARATUS FOR PORTABLE COMMUNICATION DEVICE

CLAIM OF PRIORITY

This application claims the benefit under 35 U.S.C. §119 of a Korean Patent Application filed in the Korean Intellectual Property Office on Oct. 7, 2010 and assigned Serial No. 10-2010-0097751, the entire disclosure of which is hereby incorporated by reference.

BACKGROUND OF THE INVENTION

1. Field of the Invention

The present invention relates to a keypad assembly for a portable communication device 2. Description of the Related Art Generally, "portable communication devices" mean devices by which wireless communication can be performed while roaming. The portable communication devices include a hand-held phone (HHP), a cordless telephone (CT-)2 cellular phone, a digital phone, a personal communications systems (PCS) phone, and a personal digital assistant (PDA). The portable communication devices are typically classified into a bar type, a flip type, a folder type, and a sliding type according to their shapes, and equipped with an antenna apparatus, a data input/output device, and a data transceiver. For the data input device, a keypad or touch pad screen allowing data input through a finger activation is generally used.

As shown in FIG. 1, a conventional keypad apparatus 1 includes a Printed Circuit Board (PCB) 2 where a plurality of dome switches 3 and a plurality of Light-Emitting Diodes (LEDs) 4 are provided, a waveguide sheet 5 on the dome switches 3 which includes a diffusion pattern for reflecting incoming light toward a keypad 7, a base rubber portion 6 on the waveguide sheet 5 which includes a printed surface 6a on a top surface of which numbers and characters are printed. On a bottom surface of the base rubber portion 6 are formed a plurality of pressurizing protrusions 6b.

As shown above, in the conventional keypad apparatus, the waveguide sheet, the base rubber portion having the pressurizing protrusions, and the keypad are disposed on the dome switches, which are provided on the PCB. However, this arrangement increases the thickness of the keypad apparatus and thus hindering the slimness design efforts of a product. Moreover, the waveguide and the base rubber portion having the pressurizing protrusions are essentially required which in turn degrades a clicking sensation of the keypad apparatus due to large thicknesses.

Furthermore, the conventional keypad apparatus is structured such that the LEDs provided close to the keypad. As a result, the keypad portion adjacent to the LEDs is bright due to high brightness therein and the keypad portion distant form the LEDs is dark due to low brightness therein. In other words, light from the LEDs does not uniformly illuminate the entire surface of the keypad due to distance variation, thus the keypad portion distant from the LEDs is darker and visibility of the keypad is degraded.

To solve the problem, a keypad apparatus using an Electroluminescent (EL) sheet in place of the conventional LED has been developed.

As shown in FIG. 2, a keypad apparatus 10 using a conventional EL sheet 11 is disposed under the entire surface of a keypad 12 in the form of a film to illuminate numeric and character key buttons formed on the keypad 12.

The EL sheet 11 is structured such that a transparent conductive film, an Indium-Tin Oxide (ITO)-Poly Ethylene Terephthalate (PET) film, is formed by depositing ITO on a PET film, an EL layer is formed by depositing a luminescent layer, a dielectric layer, and a back electrode on the transparent conductive film, and the EL layer is encapsulated by a protective layer (not shown).

In the EL sheet 11, once power is applied to a front electrode and the back electrode connected to ITO, the luminescent layer is excited on the whole, thus a surface light source uniformly emits light.

However, the keypad apparatus including the conventional EL sheet needs separate parts for providing an electric signal to the EL sheet for self-light-emission, thereby increasing the manufacturing cost and assembly processes of a product.

Therefore, there is a need for an apparatus which substitutes for the EL sheet and the conventional base rubber portion where the printed surface and the pressurizing protrusions are formed to achieve the slimness of the keypad apparatus, reduce the manufacturing cost, improve the efficiency of assembly processes, and improve a clicking sensation, and brightness and uniformity of the keypad.

SUMMARY OF THE INVENTION

Accordingly, an aspect of the present invention is to provide a keypad apparatus for a portable communication device, in which a waveguide sheet portion is formed such that a plurality of printed surfaces are integrally formed to be printed and adjust brightness of light, in a stepwise manner from a position distant from light-emitting diodes (LEDs) to a position adjacent to the LEDs, thereby reducing the thickness of a product by avoiding a need for a base rubber portion where a conventional printed surface is formed, while achieving the slimness of the product, and reducing the manufacturing cost of the product, and improving the efficiency of assembly processes by reducing the number of parts.

Another aspect of the present invention is to provide a keypad apparatus for a portable communication device, in which a waveguide sheet portion is provided to have a plurality of pressuring protrusions formed therein, thereby avoiding a need for a base rubber portion where conventional pressurizing protrusions are formed, and allowing the pressuring protrusions of the waveguide sheet portion to directly contact dome switches, thus improving a clicking sensation during operation.

Moreover, another aspect of the present invention is to provide a keypad apparatus for a portable communication device, in which a waveguide sheet portion is formed such that a plurality of printed surfaces are integrally formed to be printed and adjust brightness of light, in a stepwise manner from a position distant from LEDs to a position adjacent to the LEDs, thereby avoiding a need for a conventional Electroluminescent (EL) sheet and a plurality of parts for driving the EL sheet, thus reducing the manufacturing cost of a product and improving the efficiency of assembly processes and improving brightness and light-emission uniformity of the product as well as the visibility of the product.

According to yet another aspect of the present invention, a keypad apparatus for a portable communication device structured to have a Printed Circuit Board (PCB) having a plurality of dome switches and a plurality of Light-Emitting Diodes (LEDs) includes a waveguide sheet portion provided on the dome switches, a plurality of printed surfaces which are printed on a top surface of the waveguide sheet portion and adjust a brightness of light from the LEDs, in a stepwise manner from a position distant from the LEDs to a position adjacent to the LEDs, and a keypad provided on the printed surfaces.

BRIEF DESCRIPTION OF THE DRAWINGS

The above and other features and advantages of an exemplary embodiment of the present invention will be more apparent from the following detailed description taken in conjunction with the accompanying drawings, in which:

FIG. 7 is a plane view showing a second printed surface of a keypad apparatus for a portable communication device according to an embodiment of the present invention;

FIG. 8 is a plane view showing a third printed surface of a keypad apparatus for a portable communication device according to an embodiment of the present invention; and FIG. 9 is a plane view showing a fourth printed surface of a keypad apparatus for a portable communication device according to an embodiment of the present invention.

DETAILED DESCRIPTION OF THE INVENTION

Figure 1:
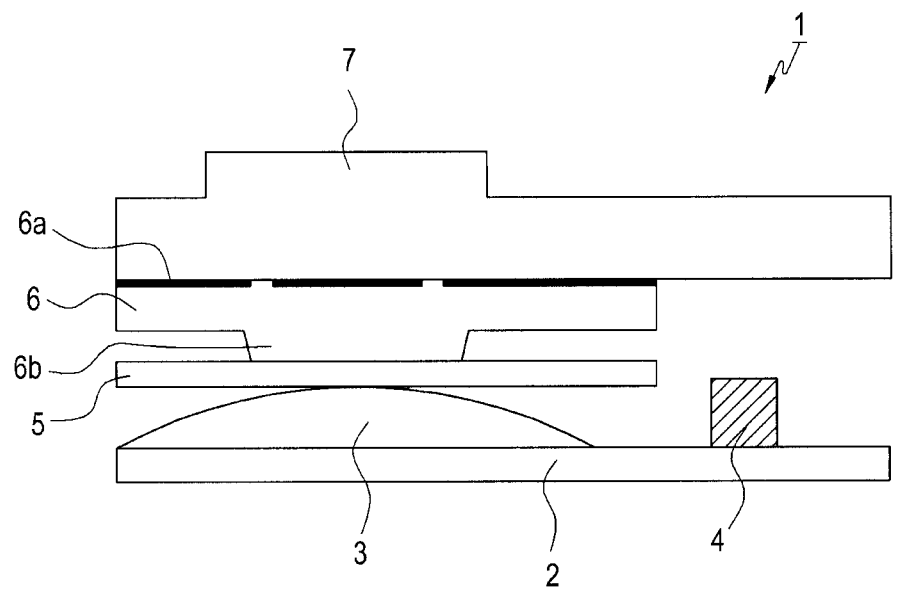
FIG. 1 is a side cross-sectional view of a conventional keypad apparatus for a portable communication device.
Figure 2:
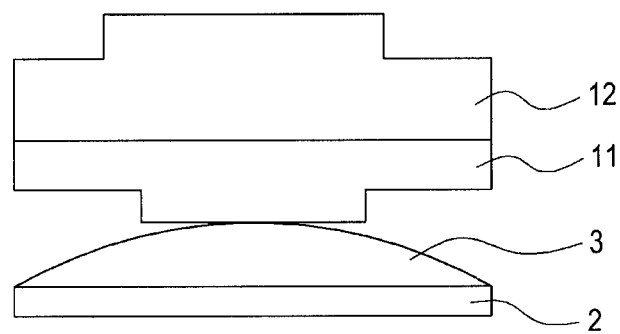
FIG. 2 is a side cross-sectional view of a conventional keypad apparatus including an Electroluminescent (EL) sheet for a portable communication device.
Figure 3:
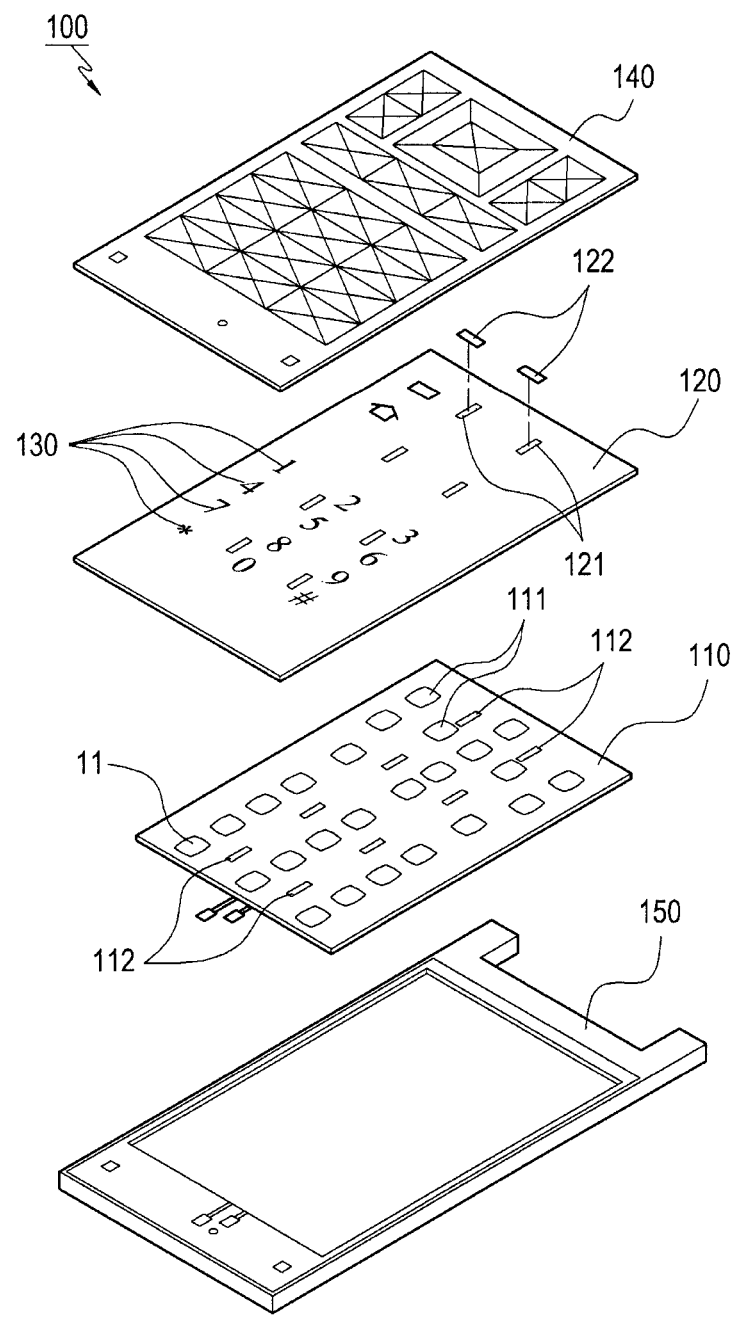
FIG. 3 is an exploded perspective view of a keypad apparatus for a portable communication device according to an embodiment of the present invention.

Hereinafter, an exemplary embodiment of the present invention will be described in detail with reference to the accompanying drawings. The embodiment disclosed in the specification and structures shown in the drawings are merely exemplary ones of the present invention, and it should be understood that various variations capable of substituting for the embodiment may exist at the time of filing the application.

Referring to FIGS. 3 through 9, a keypad apparatus 100 includes a Printed Circuit Board (PCB) 110 including a plurality of dome switches 111 and a plurality of Light-emitting diodes (LEDs) 112, a waveguide sheet portion 120, a plurality of printed surfaces 130, a PCB housing 150 and a keypad 140. On the dome switches 11 is provided the waveguide sheet portion 120 to reflect light A1 from the LEDs 112 thereinto, thus allowing the light A1 to travel with a predetermined refractive index. The printed surfaces 130 are integrally formed on a top surface of the waveguide sheet portion 120 to be printed and variably adjust, in step, brightness of the light A1 from the LEDs 112 from a position distant from the LEDs 112 to a position adjacent to the LEDs 112 by varying diffusion ink formed on the respective printed surface. The keypad 140 includes a plurality of key buttons and is provided on the printed surfaces 130 to diffract the light A1 from the waveguide sheet portion 120 to outside.

Figure 4:
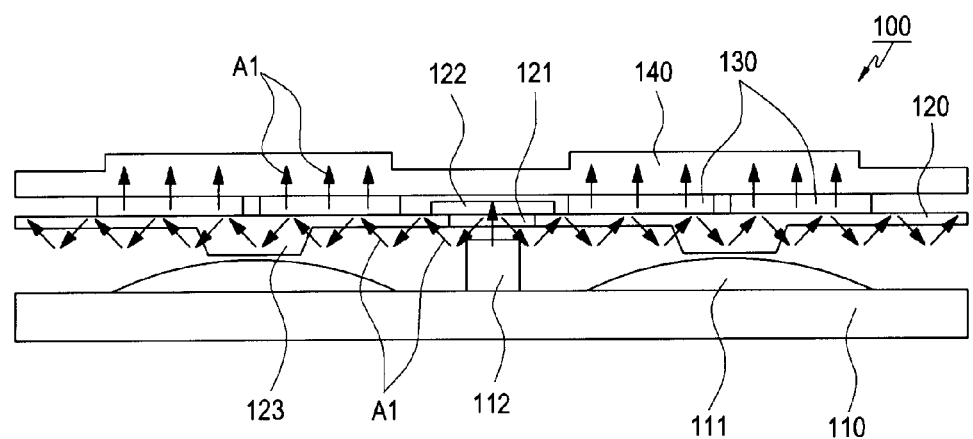
FIG. 4 is a side cross-sectional view showing an operating state of a keypad apparatus for a portable communication device according to an embodiment of the present invention.

As shown in FIG. 4, the waveguide sheet portion 120 includes at least one waveguide holes 121, at least one reflecting sheet portions 122, and at least one pressurizing protrusions 123. The waveguide holes 121 are formed in the waveguide sheet portion 120 to cause the light A1 from the LEDs 112 to be introduced to the waveguide sheet portion 120, and the reflecting sheet portions 122 are provided on the waveguide holes 121 to reflect the light A1 from the LEDs 112 into the waveguide sheet portion 120. The pressurizing protrusions 123 are integrally formed on a bottom surface of the waveguide sheet portion 120 such that the waveguide sheet portion 120 and the dome switches 111 contact by pressing of the keypad 140 while enhancing a clicking sensation.

As shown in FIGS. 3 and 5 through 9, the printed surfaces 130 include a first printed surface 131, a second printed surface 132, a third printed surface 133, and a fourth printed surface 134. The first printed surface 131 is printed in a position distant from the LEDs 112 to be provided with a high brightness of the light A1 from the LEDs 112. The second printed surface 132 is printed in a position adjacent to the first printed surface 131 to be provided with a lower brightness than the brightness of the first printed surface 131. The third printed surface 133 is printed in a position adjacent to the second printed surface 132 to be provided with a lower brightness than the brightness of the second printed surface 132. The fourth printed surface 134 is printed in a position adjacent to the LEDs 112 to be provided with a lower brightness than the brightness of the third printed surface 133. Different degree of brightness is achieved as follows.

As shown in FIGS. 5 through 9, the first printed surface 131 is formed with one-degree diffusion ink such that the brightens of the light A1 therein is highest, the second printed surface 132 is formed with two-degree diffusion transparent ink such that the brightness of the light A1 therein is lower than that in the first printed surface 131, the third printed surface 133 is formed with three-degree transparent ink such that the brightness of the light A1 therein is lower than that in the second printed surface 132, and the fourth printed surface 134 is formed with four-degree cool gray ink such that the brightness of the light A1 therein is lower than that in the third printed surface 133.

In the embodiment, the first printed surface 131 and the second printed surface 132 are formed to have the white color. The first printed surface 131, the second printed surface 132, the third printed surface 133, and the fourth printed surface 134 include one type of numbers, characters, and symbols, respectively.

Meanwhile, the keypad apparatus 100 according to the embodiment of the present invention is applied to a portable communication device for illustrative purpose; however, various other types of terminals having a keypad apparatus applicable, such as a bar-type terminal, a folder-type terminal, a sliding-type terminal, a swing-type terminal, and so forth. Moreover, the teachings of the present invention can be applied to other information communication apparatuses and multimedia apparatuses such as Portable Multimedia Players (PMPs), MP3 players, navigation systems, game consoles, notebooks, advertising boards, TVs, digital broadcasting players, Personal Digital Assistants (PDAs), smart phones, and so forth, and their application apparatuses.

With reference to FIGS. 3 through 9, a description will now be made of an operating process of the above-structured keypad apparatus 100 for a portable communication device according to an embodiment of the present invention.

As shown in FIGS. 3 through 9, the keypad apparatus 100 for a portable communication device includes the PCB 110 including the plurality of dome switches 111 and the plurality of LEDs 112, the waveguide sheet portion 120, the plurality of printed surfaces 130, and the keypad 140. As shown in FIG.

4, on the dome switches 111 and the LEDs 112 included in the PCB 110 is disposed the waveguide sheet portion 120 on a top surface of which the keypad 140 is disposed by using a both-sided tape (not shown).

As shown in FIGS. 4 through 9, when the keypad apparatus 100 is used, the light A1 from the LEDs 112 is introduced to the waveguide sheet portion 120 through the waveguide holes 121 included in the waveguide sheet portion 120, and the reflecting sheet portions 122 provided on the waveguide holes 121 reflect and refract the introduced light A1 to cause the light A1 to move into the waveguide sheet portion 120.

The light A1 moving into the waveguide sheet portion 120 is guided along the printed surfaces 130 of the waveguide sheet portion 120, thus illuminating the keypad 140.

In this state, once the user presses the keypad 140, the keypad 140 then presses the printed surfaces 130, together with the waveguide sheet portion 120. At this time, the pressurizing protrusions 123 formed in the waveguide sheet portion 120 are also pressed, thus contacting the dome switches 111.

As such, upon pressing of the keypad 140, the pressurizing protrusions 123 of the waveguide sheet portion 120 immediately contact the dome switches 111, thus improving a clicking sensation.

The printed surfaces 130 of the waveguide sheet portion 120 may be printed and adjust the brightness of the light A1 from the LEDs 112, in a stepwise manner from a position distant from the LEDs 112 to a position adjacent to the LEDs 112.

As shown in FIGS. 5 through 9, the printed surfaces 130 include the first printed surface 131, the second printed surface 132, the third printed surface 133, and the fourth printed surface 134.

Figures 5, 6:
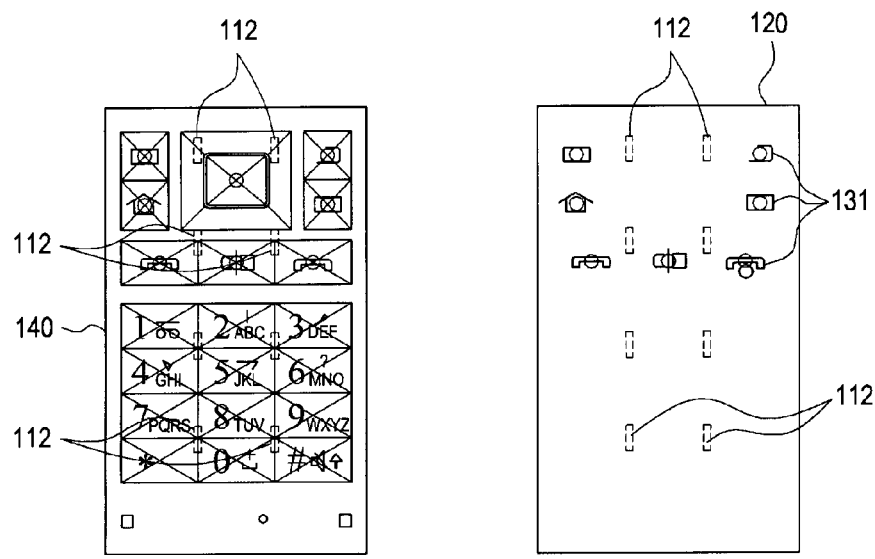
FIG. 5 is a plane view showing a plurality of printed surfaces printed on a waveguide sheet portion of a keypad apparatus for a portable communication device according to an embodiment of the present invention.
FIG. 6 is a plane view showing a first printed surface of a keypad apparatus for a portable communication device according to an embodiment of the present invention.

As shown in FIG. 6, the first printed surface 131 is printed in a position most distant from the LEDs 112. In the first printed surface 131 printed in the most distant position, the brightness of the light A1 from the LEDs 112 is low, such that the first printed surface 131 is formed with the one-degree diffusion ink which provides a high brightness of the light A1 with a small amount of light A1.

As shown in FIG. 7, the second printed surface 132 is printed in a position adjacent to the first printed surface 131 and adjacent to the LEDs 112. In the second printed surface 132, the brightness of the light A1 from the LEDs 112 is higher than that in the first printed surface 131, such that the second printed surface 132 is formed with the two-degree diffusion transparent ink which provides a high brightness of the light A1 with a small amount of light A1.

As shown in FIG. 8, the third printed surface 133 is printed in a position adjacent to the second printed surface 132 and adjacent to the LEDs 112. In the third printed surface 133, the brightness of the light A1 from the LEDs 112 is higher than that in the second printed surface 132, such that the third printed surface 133 includes three-degree transparent ink which provides a high brightness of the light A1 with a small amount of light A1.

As shown in FIG. 9, the fourth printed surface 134 is printed in a position adjacent to the third printed surface 133 and adjacent to the LEDs 112. In the fourth printed surface 134, the brightness of the light A1 from the LEDs 112 is highest, such that a hot spot of the LEDs 112 is generated. To prevent the hot spot, the fourth printed surface 134 is formed with four-degree cool gray ink which reduces the brightness of the light A1.

Accordingly, the first printed surface 131, the second printed surface 132, the third printed surface 133, and the fourth printed surface 134 are offset-printed stepwise according to their positions with respect to the LEDs 112. Higher degree of diffusion ink is used as it is close to the source of LED to counter balance the uneven brightness.

As such, in the waveguide sheet portion 120, the first printed surface 131, the second printed surface 132, the third printed surface 133, and the fourth printed surface 134 are integrally formed to be printed from a position distant from the LEDs 112 to a position adjacent to the LEDs 112 and to selectively adjust the brightness of the light A1 from the LEDs 112 using different degree of diffusion ink on the respective printed surface, thereby preventing the hot spot phenomenon as it nears the LEDs 112 and providing the uniformity of light emission of the keypad 140.

It will be obvious to those of ordinary skill in the art that a keypad apparatus for a portable communication device according to the present invention described above is not limited by the foregoing embodiment and drawings, and various substitutions, modifications, and changes can be made in terminals having various exterior shapes such as a sliding type, a swing type, a waterproof terminal, and so forth.

What is claimed is:

1. A keypad apparatus for a portable communication device including a Printed Circuit Board (PCB) having a plurality of dome switches and a plurality of Light-Emitting Diodes (LEDs), the keypad apparatus comprising:
   a waveguide sheet portion provided over the plurality dome switches;
   a plurality of printed surfaces that are formed with diffusion ink and printed on a top surface of the waveguide sheet portion on a degree by adjusting the degree of the diffusion ink with respect to a print position variably according to positions of the LEDs and the printed surfaces; and
   a keypad provided over the plurality of printed surfaces,
   wherein the degree of the diffusion ink forms a low brightness of light if the positions of the LEDs and the printed surfaces are adjacent to each other and the degree of the diffusion ink forms a high brightness of light if the positions of the LEDs and the printed surfaces are distant from each other.

2. The keypad apparatus of claim 1, wherein the waveguide sheet portion comprises:
   at least one waveguide hole formed in the waveguide sheet portion to introduce the light from the LEDs into the waveguide sheet portion;
   at least one reflecting sheet portions provided on the waveguide holes to reflect the light from the LEDs into the waveguide sheet portion; and
   at least one pressurizing protrusion formed on the waveguide sheet portion in contact with the dome switches.

3. The keypad apparatus of claim 1, wherein the plurality of printed surfaces comprise:
   a first printed surface printed in a position distant from the LEDs to provide a high brightness of light;
   a second printed surface printed in a position adjacent to the first printed surface to provide a lower brightness than the brightness of the first printed surface;
   a third printed surface printed in a position adjacent to the second printed surface to provide a lower brightness than the brightness of the second printed surface; and
   a fourth printed surface printed in a position adjacent to the third printed surface and adjacent to the LEDs to provide a lower brightness than the brightness of the third printed surface, wherein each of the first printed surface, second printed surface, third printed surface, and fourth printed surface is formed with a respectively different degree of diffusion ink.

4. The keypad apparatus of claim 3, wherein the first printed surface is formed with diffusion ink.

5. The keypad apparatus of claim 3, wherein the second printed surface is formed with diffusion transparent ink.

6. The keypad apparatus of claim 3, wherein the third printed surface is formed with transparent ink.

7. The keypad apparatus of claim 3, wherein the fourth printed surface is formed with gray ink.

8. The keypad apparatus of claim 3, wherein the first printed surface and the second printed surface are formed to have a white color.

9. The keypad apparatus of claim 1, wherein the plurality of printed surfaces comprise one type of numbers, characters, and symbols, respectively.

10. A keypad assembly, comprising:
a waveguide sheet portion;
a plurality of printed surfaces that are formed with diffusion ink and printed on a top surface of the waveguide sheet portion on a degree by adjusting the degree of the diffusion ink with respect to a print position variably according to positions of a LEDs and the printed surfaces; and
a keypad provided on the printed surfaces,
wherein the degree of the diffusion ink forms a low brightness of light if the positions of the LEDs and the printed surfaces are adjacent to each other and the degree of the diffusion ink forms a high brightness of light if the positions of the LEDs and the printed surfaces are distant from each other.

11. The keypad assembly of claim 10, wherein the plurality of printed surfaces comprise:

a first printed surface printed at a first position from the LEDs to provide a first brightness;
a second printed surface printed at a second position adjacent to the first printed surface to provide a second brightness lower than the first brightness;
a third printed surface printed at a third position adjacent to the second printed surface to provide a third brightness lower than the second brightness; and
a fourth printed surface printed in fourth position adjacent to the third printed surface to provide a fourth brightness lower than the third brightness,
wherein each of the first printed surface, second printed surface, third printed surface, and fourth printed surface is formed with a respectively different degree of diffusion ink.

12. The keypad assembly of claim 11, wherein the first printed surface is formed with diffusion ink.

13. The keypad assembly of claim 11, wherein the second printed surface is formed with diffusion transparent ink.

14. The keypad assembly of claim 11, wherein the third printed surface is formed with transparent ink.

15. The keypad assembly of claim 11, wherein the fourth printed surface is formed with gray ink.

16. The keypad assembly of claim 11, wherein the first printed surface and the second printed surface are formed to have a white color.

17. The keypad assembly of claim 10, wherein the plurality of printed surfaces comprise one type of numbers, characters, and symbols, respectively.

18. The key pad assembly of claim 10, wherein at least one of the plurality of printed surfaces is provided with a different diffusion ink level formed thereon to vary the brightness of the respective printed surface in relation to the LEDs.

* * * * *